United States Patent Office 3,089,876
Patented May 14, 1963

3,089,876
1-(β-AMINOETHYL)-4-(β-HYDROXYETHYL)-PIPERAZINE
Tsung Y. Shen, Westfield, Edward F. Rogers, Middletown, and Lewis H. Sarett, Princeton, N.J., assignors to Merck & Co., Inc., Rahway, N.J., a corporation of New Jersey
No Drawing. Original application Oct. 14, 1958, Ser. No. 767,102, now Patent No. 3,031,452, dated Apr. 24, 1962. Divided and this application Nov. 20, 1961, Ser. No. 153,745
1 Claim. (Cl. 260—268)

The novel compounds of this invention may be prepared by reacting the corresponding halogen precursor compounds with anhydrous ammonia, or by the hydrogenation of the corresponding cyano precursor compounds, as more fully is shown in the examples set forth hereinafter.

Our novel heterocyclic amines are useful as intermediates for the preparation of thiaxanthenone derivatives in accordance with the procedure set forth in the examples which follow.

The thiaxanthenone derivatives formed from the novel heterocyclic amines of this invention are useful as chemotherapeutic agents for treating schistosomiasis. They are preferably employed for this purpose in the form of hydrohalides, especially the hydrochlorides. These materials can be administered in the form, dosage and manner as the antischistosome agent, 1-methyl-4-β-diethylaminoethylamino-thiaxanthenone hydrochloride (Miracil D), is administered.

The invention is further illustrated by the following examples, in which all temperatures, unless otherwise indicated, are in degrees centigrade.

EXAMPLE I

In this example, N-ethyl-2-aminoethylpiperidine is prepared from N-ethyl-2-chloromethylpiperidine hydrochloride, which is made from N-ethyl-2-hydroxymethylpiperidine, which is obtained, alternatively, from 2-acetoxy-methylpyridine or 2-hydroxymethylpyridine. 1-(2-N-ethylpiperidylmethylamino) - 4 - methyl-10-thiaxanthenone hydrochloride is then prepared from N-ethyl-2-aminoethylpiperidine.

N-Ethyl-2-Hydroxymethylpiperidine (A) FROM 2-ACETOXYMETHYLPYRIDINE

A solution of 117 g. of 2-acetoxymethylpyridine, prepared from picoline-N-oxide, in 300 ml. of ethanol was shaken under hydrogen at 1900 p.s.i. at 19° for 20 hours, in the presence of 10 g. of 10% ruthenium on carbon. The solution was filtered and concentrated under reduced pressure to ca. 200 ml. After the addition of 100 ml. of acetic anhydride the solution was again concentrated under reduced pressure to ca. 200 ml., and was stored at room temperature for 18 hours. Fractionation of the reaction mixture through a 8″ Vigreux column afforded 23.6 g. of N-acetyl-2-acetoxy-methylpiperidine, B.P. 135° (0.8 mm.), $n_D^{25}$ 1.4850.

Analysis.—Calcd. for $C_{10}H_{17}O_3N$: C, 60.26; H, 8.62; N, 7.06. Found: C, 60.36; H, 8.35; N, 6.98.

To a suspension of 8 g. of lithium aluminum hydride in 800 ml. of tetrahydrofuran was added slowly with ice-cooling and stirring a solution of 19.9 g. of N-acetyl-2-acetoxymethylpiperidine in 40 ml. of tetrahydrofuran. The mixture was stirred at 0° for 0.5 hr., at room temperature for 2 hours, and was then heated at the reflux temperature for 2 hrs. After the addition of ethyl acetate and 20 ml. of ice-water with cooling, the supernatent solution was decanted. The solid residue was dissolved in dilute sodium hydroxide and extracted continuously with ether for 24 hrs. The ethereal extract was combined with the tetrahydrofuran solution, dried over potassium carbonate, filtered, concentrated, and fractionated. N-ethyl-2-hydroxymethylpiperidine (8.6 g.) was collected at B.P. 102° (16 mm.), $n_D^{23}$ 1.4834.

Analysis.—Calcd. for $C_8H_{17}NO$: C, 67.08; H, 11.97. Found: C, 67.16; H, 11.62.

(B) FROM 2-HYDROXYMETHYLPYRIDINE

A solution of 250 g. of 2-hydroxymethylpyridine in 450 ml. of ethanol was hydrogenated at 100–125° under 4200 p.s.i. in the presence of a Raney nickel catalyst. The solution was filtered and treated with 250 g. of ethyl bromide and 180 g. of potassium carbonate at room temperature for 3.5 days with occasional shaking. The reaction mixture was filtered, concentrated under reduced pressure to a syrup and filtered again. The solid was dissolved in 200 ml. of water, saturated with potassium carbonate and extracted with chloroform. The chloroform extract was combined with the syrup and distilled to afford 223 g. (68%) of N-ethyl-2-hydroxymethylpiperidine.

N-Ethyl-2-Chloromethylpiperidine Hydrochloride

A solution of 75 g. of N-ethyl-2-hydroxymethylpiperidine in 500 ml. of chloroform was treated with excess hydrogen chloride with ice-cooling. Thionyl chloride (90 g.) was added slowly with stirring and ice-cooling and the mixture was stirred at room temperature for 1 hr. followed by heating at the reflux temperature for 1 hr. The solution was evaporated under reduced pressure to a semi-solid which was recrystallized from ethanol-ethyl acetate as white needles, M.P. 197°. The yield was 64 g.

Analysis.—Calcd. for $C_8H_{17}NCl_2$: C, 48.5; H, 8.67. Found: C, 48.91; H, 8.70.

N-Ethyl-2-Aminomethylpiperidine

A solution of 20 g. of N-ethyl-2-chloromethylpiperidine hydrochloride in 60 ml. of anhydrous ammonia was heated at 100° for 6 hrs. After evaporation of solvent the residue was dissolved in saturated potassium carbonate and extracted with chloroform. Distillation of the chloroform extract afforded 14.5 g. of the amine, B.P. 90° (16 mm.), $n_D^{25}$ 1.4760.

Analysis.—Calcd. for $C_8H_{18}N_2$: C, 67.55; H, 12.75. Found: C, 67.11; H, 12.15.

N-ethyl-2-aminomethylpiperidine dipicrate was prepared from the amine and picric acid in ethanol and recrystallized from methanol-ethanol, M.P. 204° (dec.).

Analysis.—Calcd. for $C_{20}H_{24}N_8O_{14}$: C, 40.0; H, 4.0. Found: C, 40.31; H, 3.95.

1-(2-N-Ethylpiperidylmethylamino)-4-Methyl-10-Thiaxanthenone Hydrochloride

A mixture of 40 g. of isomeric chloromethylthiaxanthenone, 30 g. of N-ethyl-2-aminomethylpiperidine and 20 ml. of pyridine was heated at the reflux temperature for 16 hrs. The reaction mixture was treated with excess of dilute sodium carbonate, and the precipitate was collected and digested with acetic acid. After dilution with 3 volumes of water the acetic acid solution was filtered, and was then neutralized with ammonium hydroxide. The free base separated was collected, dissolved in ethanol and treated with ethanolic hydrogen chloride. The salt was recrystallized from ethanol, M.P. 218° (9.5 g.).

Analysis.—Calcd. for $C_{22}H_{27}N_2OSCl$: C, 65.7; H, 6.72; N, 6.97. Found C, 66.11; H, 6.57; N, 674.

EXAMPLE II

In this example, 1-(β-aminoethyl)-4-(β-hydroxyethyl)-piperazine was derived from 1-cyanomethyl-4-β-hydroxyethylpiperazine, which was derived in two ways, first from 1-β-hydroxyethylpiperazine by conversion of the latter to a crystalline sodium sulfonate which was then treated with potassium cyanide, and second by alkylation of 1-β-hydroxyethylpiperazine with chloroacetonitrile. 1-(β-4'-hydroxyethylpiperazineylethylamino) - 4 - methyl-10-thiaxanthenone dihydrochloride was then prepared from the above heterocyclic amine.

*1-Cyanomethyl-4-β-Hydroxyethylpiperazine*

(A) FROM CRYSTALLINE SODIUM SULFONATE

A solution of 0.18 mole of sodium bisulfite and 0.18 mole of formaldehyde in 35 ml. of water was mixed with 20 g. of 1-β-hydroxyethylpiperazine with stirring and cooling. The white precipitate formed was collected on a filter, washed with ethanol and dried. The product was redissolved in 30 ml. of water. After the addition of 12 g. of potassium cyanide, the mixture was heated on a steam bath with occasional shaking for one hr. Excess of potassium carbonate was added, and the product was extracted with chloroform. Evaporation of the chloroform solution gave a brown syrup, and this was again extracted with three portions of 150 ml. of ether leaving a solid residue, M.P. 80°. The ethereal solution was concentrated and the product was distilled at B.P. 113–114° (0.2 mm.), $n_D^{22}$ 1.5062. The oil crystallized on cooling M.P. 40°. The yield was 16.3 g (63%)

*Analysis.*—Calcd. for $C_8H_{15}N_3O$: C, 56.8; H, 8.88; N, 24.9. Found: C, 56.19; H, 8.51; N, 25.07.

The product formed a dihydrochloride, which was recrystallized from a mixture of methanol and ethanol, M.P. 201° (dec.).

*Analysis.*—Calcd. for $C_8H_{17}N_3OCl$: C, 39.7; H, 7.02; N, 17.35. Found: C, 39.87; H, 6.89; N, 16.86.

The product was further characterized as its acetate, 1-cyanomethyl-4-β-acetoxyethylpiperazine, B.P. 120° (0.1 mm.).

*Analysis.*—Calcd. for $C_{10}H_{17}N_3O_2$: C, 56.9; H, 8.12; N, 19.92. Found: C, 56.93; H, 7.67; N, 19.40.

The ether-insoluble residue, M.P. 80°, was recrystallized from a mixture of benzene and chloroform to afford an analytical pure sample, MP. 92–93°. This by-product was identified as 1-carbamylmethyl-4-β-hydroxyethylpiperazine.

*Analysis.*—Calcd. for $C_8H_{17}N_3O_2$: C, 51.3; H, 9.1. Found: C, 51.36; H, 8.27.

The amide was acetylated with acetic anhydride to form 1 - carbamylmethyl-4-β-acetoxyethylpiperazine, recrystallized from benzene pet. ether, M.P. 81°.

*Analysis.*—Calcd. for $C_{10}H_{19}N_3O_3$: C, 52.45; H, 8.3; N, 18.3. Found: C, 52.79; H, 8.00; N, 17.92.

(B) BY ALKYLATION

A mixture of 12 g. of 1-β-hydroxymethylpiperazine and 8 g. of chloroacetonitrile was heated in 200 ml. of ethanol at the reflux temperature for 18 hrs. The solution was evaporated to a syrup under reduced pressure, and the syrup was redissolved in chloroform. The solution was washed with 10% sodium hydroxide solution and dried over potassium carbonate. Evaporation of the chloroform solution gave a syrup which was extracted with three portions of 100 ml. of ether. The ethereal solution was evaporated and fractionated to give the product, B.P. 114° (0.2 mm.), which crystallized on cooling, M.P. 39–40° (7.4 g.)

*1-β-Aminoethyl-4-β-Hydroxyethylpiperazine*

A solution of 11 g. of 1-cyanomethyl-4-β-hydroxyethylpiperazine in 35 ml. of ethanol and 25 g. of anhydrous ammonia was hydrogenated in the presence of one teaspoonful of Raney nickel catalyst under 1700 p.s.i. at 100° for 6 hrs. The solution was filtered and concentrated under reduced pressure. The residual syrup was distilled in a short-path distillation apparatus with a bath temp. of 200° (1 mm.) to afford 10.1 g. of the product, $n_D^{24}$ 1.5140.

The product formed a trihydrochloride which was recrystallized from aqueous ethanol, M.P. 241–243°.

*Analysis.*—Calcd. for $C_8H_{22}N_3OCl_3$: C, 34.1; H, 7.8; N, 14.85. Found: C, 34.58; H, 7.49; N, 15.16.

*1-(β-4'-Hydroxyethylpiperazinylethylamino)-4-Methyl-10-Thiaxanthenone Dihydrochloride*

A mixture of 3 g. of 1-β-aminoethyl-4-β-hydroxyethylpiperazine and 5 g. of isomeric chloromethylthiaxanthenones was heated in 5 ml. of pyridine at the reflux temp. for 22 hrs. The solution was poured into dilute sodium hydroxide and the precipitate was collected and digested with 50 ml. of 20% acetic acid containing 2 ml. of hydrochloric acid. The reddish solution was filtered and neutralized with dilute sodium hydroxide. The precipitate formed was collected and washed thoroughly with water. It was redissolved in ethanol and the solution was treated with excess of ethanolic hydrogen chloride. The dark red solution was evaporated under reduced pressure, and the residue was recrystallized from aqueous ethanol as yellow needles, M.P. 238–240° (1.1 g.).

*Analysis.*—Calcd. for $C_{22}H_{29}N_3O_2SCl_2$: C, 56.25; H, 6.23; N, 8.94. Found: C, 56.02; H, 6.18; N, 8.92.

The present application is a division of our copending application, Serial No. 767,102, filed October 14, 1958, now Patent No. 3,031,452.

We claim:

1-(β-aminoethyl)-4-(β-hydroxyethyl)-piperazine.

References Cited in the file of this patent

FOREIGN PATENTS

| | | |
|---|---|---|
| 656,588 | Great Britain | Aug. 29, 1951 |
| 1,001,411 | France | Feb. 25, 1952 |